April 20, 1926.
J. S. UNGER
1,581,367
AMMONIA DISTILLATION
Filed Dec. 22, 1924
3 Sheets-Sheet 1
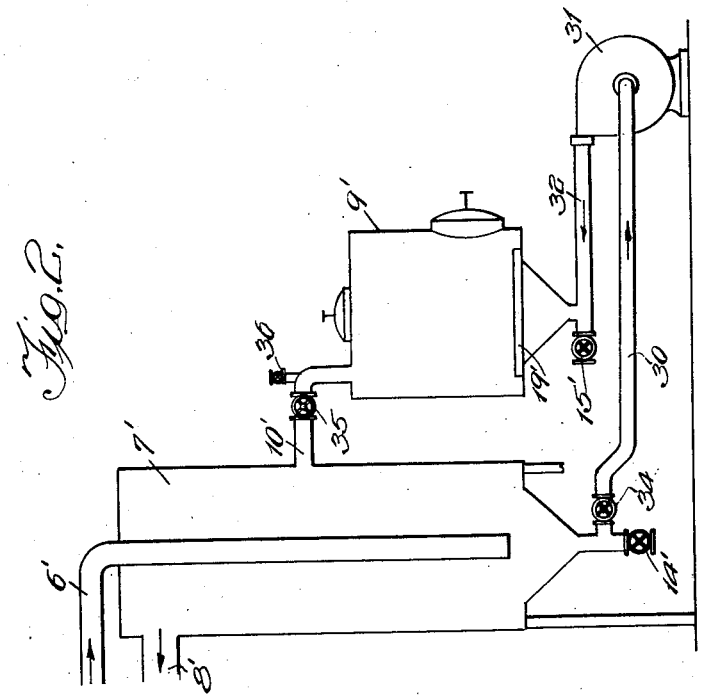
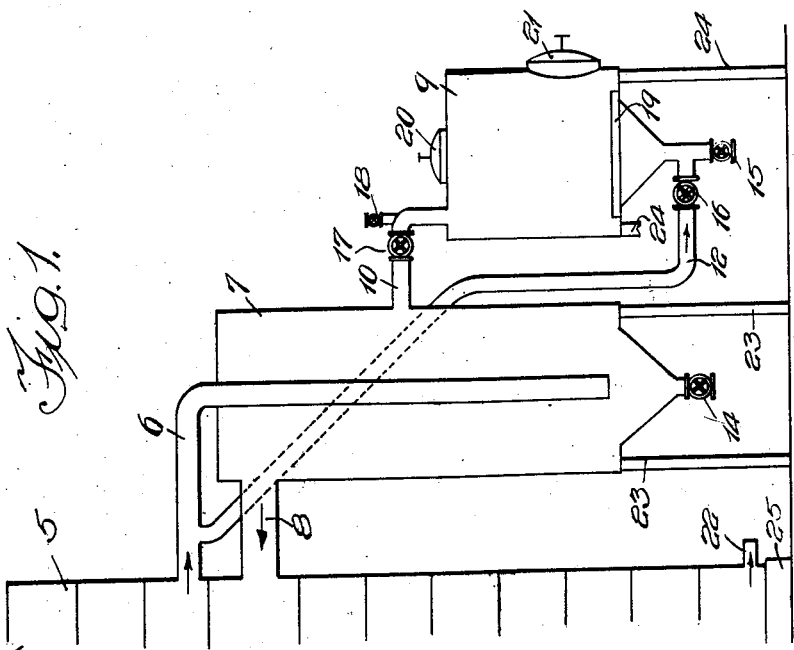

April 20, 1926.
J. S. UNGER
1,581,367
AMMONIA DISTILLATION
Filed Dec. 22, 1924
3 Sheets-Sheet 2
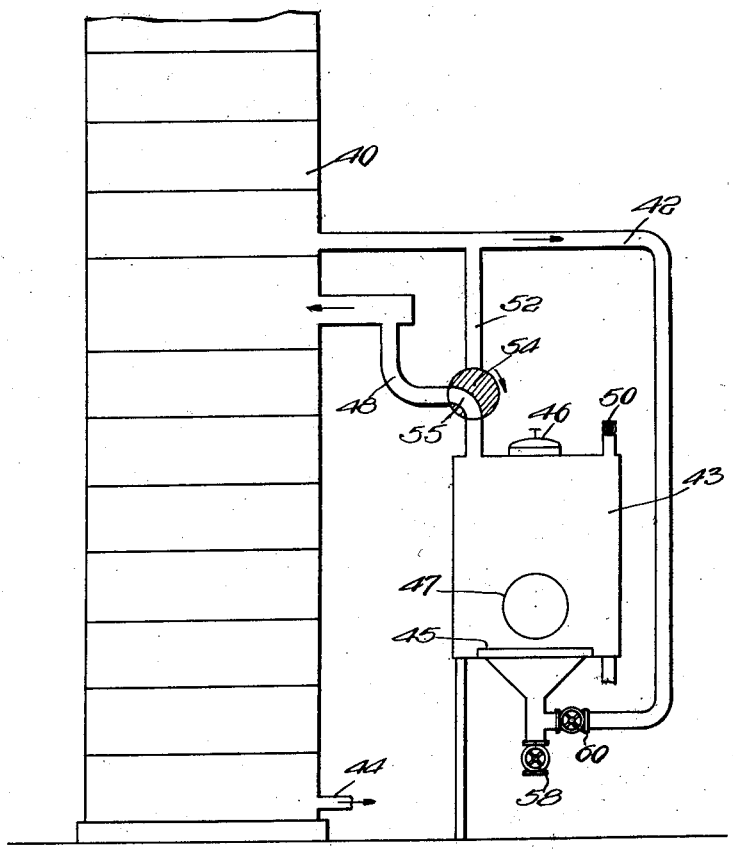

April 20, 1926.

J. S. UNGER 1,581,367

AMMONIA DISTILLATION

Filed Dec. 22, 1924

Witnesses:
W. F. Kilroy
Harry E. White

Inventor:
John S. Unger
By Brown Boettcher Renner
Attys

Patented Apr. 20, 1926.

1,581,367

UNITED STATES PATENT OFFICE.

JOHN S. UNGER, OF CHICAGO, ILLINOIS.

AMMONIA DISTILLATION.

Application filed December 22, 1924. Serial No. 757,305.

*To all whom it may concern:*

Be it known that I, JOHN S. UNGER, a citizen of the United States, residing at Chicago, in the county of Cook and State of Illinois, have invented a certain new and useful Improvement in Ammonia Distillation, of which the following is a full, clear, concise, and exact description, reference being had to the accompanying drawings, forming a part of this specification.

This invention relates to ammonia distillation, and more particularly to ammonia distillation systems of the continuous type.

In systems of this type, the weak or crude ammonia liquor is fed into the continuous distilling column, which is heated as by the introduction of open steam. The crude ammonia liquor running down over the plates of the distilling column comes into contact with the open steam, and the volatile ammonia is boiled out in the upper part of the still by the steam rising upward therethrough.

A caustic, such as lime, is then introduced and mixed with the hot liquor to liberate the ammonia. The ammonia is not immediately released in a gaseous form, and in order to boil it out, the liquor is further treated with steam in the compartments of the lower part of the distilling column, or in a separate still or column connected to the still for treating the volatile ammonia until practically all of the ammonia is freed from the liquor discharged from the bottom of the still.

Thus, it is necessary to supply the lime in such a manner that the liquor is acted upon before it enters the still for boiling out the ammonia that was in a fixed state, and a mixing vessel is provided, generally called the lime leg, where the liquor and the lime remain in contact for some time. Usually, burned lime is used, and, in order to get it into the still, it has heretofore been necessary to slake it, that is, mix it with water, the mixture being pumped into the lime leg in a steady stream, somewhat in excess of the theoretical quantity of lime required. Thus, a considerable quantity of water will enter the still for no other purpose than for introducing the lime. This dilutes the liquor and causes more steam to be used than otherwise would have been necessary. Clogging of the lime and impurities has made the matter of designing and connecting up such systems difficult, and the matter of accessibility for cleaning has also been difficult. Even where any measure of accessibility for this purpose has been provided, it has been necessary to shut down the entire system to clean it. In addition, considerable lime has been wasted and not carried forward by the water into the still, owing to insufficient slaking or it being in such a state that the cold water used will not sufficiently disintegrate it.

To overcome the losses and difficulties in connection with using slaked lime and supplying it to ammonia stills mixed with water, attempts have been made to charge solid lime into vessels attached to the still by means of connections controlled by valves, and conducting the hot liquor through these vessels, but the results obtained have not been satisfactory.

My invention consists in providing a separate vessel or vessels, containing hot liquor and lime and connecting the vessel to the still in such manner that the liquor will be caused to pass positively through it upwards through the lime, and providing means for by-passing the liquor from the vessel, so it can be charged with lime, without shutting down the still and without in any way interfering with the passage of the liquor through the still.

By placing a grate in the vessel to support the lime, and by passing the liquor up through the lime from below, the lime will act upon the liquor until there remains only the sand and stones resting on the grate, which, when they have accumulated in sufficient quantity, may be removed from the vessel through a cleaning opening. Slaking of the lime and the use of additional steam are unnecessary. Clogging of the pipes and the still is avoided or at least minimized and the process goes on without interruption. The necessity for slaking the lime or mixing it with water aforehand is avoided and the lime thereby better utilized. because it will be slaked by the hot liquor itself. Less steam will be required in the still, less labor for attendance will be required, and the matter of interrupting the distilling process for the purpose of cleaning the still and the lime leg will be avoided.

In the drawings:—

Fig. 1 is a diagrammatic view of a system embodying my invention; and

Figs. 2, 3 and 4 are fragmentary diagrammatic views of alternative embodiments of the invention.

Figure 4:
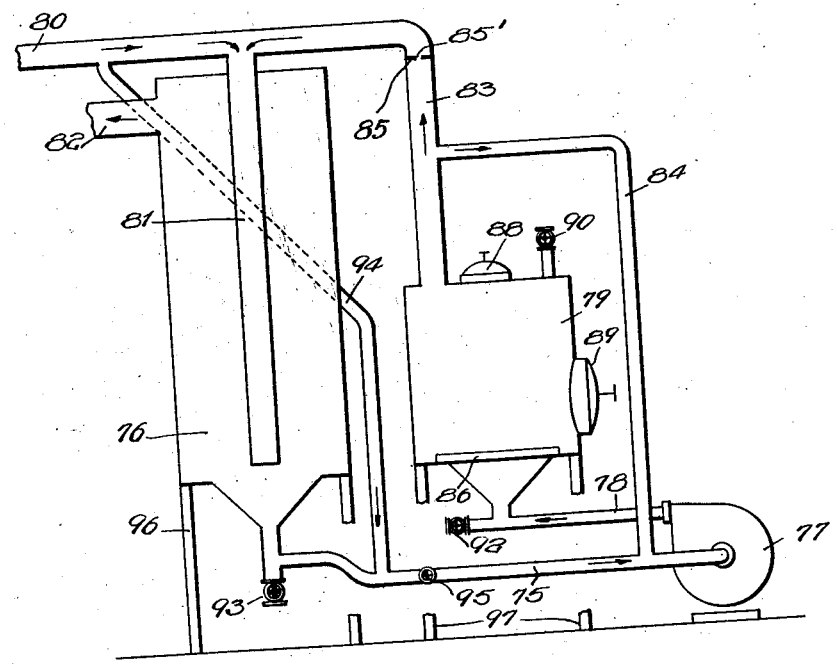

In Fig. 1 the distilling column is designated at 5. The crude liquor enters the top of column 5 in a steady stream, as from a suitable feed tank (not shown). It may be preheated, if desired. The liquor passes through the column 5 and the volatile ammonia is boiled out in the upper part of the still by the steam rising upward through the various compartments. The steam is introduced at the bottom of the column 5 in the usual or any suitable manner (not shown).

The ammonia in a fixed form and with its impurities passes off from the upper part of column 5 into a pipe or conduit 6 which conducts it downwardly into the bottom of the lime leg, designated 7. The top of the lime leg or vessel 7 is connected back to the still or column 5 by a pipe or passage 8, so that the liquor which passes to the bottom of vessel 7 will overflow back into the still through passage 8. Leading off centrally from lime leg or vessel 7 to the top of a lime vessel 9 is a pipe or passage 10 and a by-pass passage or conduit 12 leads from the pipe 6 to the bottom of lime vessel 9. Vessels 7 and 9 have drain valves 14 and 15, respectively. The pipe or conduit 12 has a shut-off valve 16 and the passage 10 has a shut-off valve 17 and a vent valve 18 for admitting air into the lime vessel so that a little liquor may be drained out of the vessel to give room for the lime.

The lime vessel 9 has a grate 19 formed to hold the lime and prevent it and the sand and the like from passing down through it, and, at the same time, permitting the liquor to pass freely up through it and the lime thereon. The vessel 9 also has at its top a door 20 for charging the lime or introducing it into the vessel 9 upon the grate 19 and a door 21 in one side for cleaning purposes. By making up the grate 19 in parts, it can be readily taken out through the door 21 and cleaned when desired, or the door might even be sufficiently large to permit taking the grate 19 out in one piece for that purpose.

The bottom of distilling column 5 has the usual outlet 22, and the vessels 7 and 9 may be supported in upright position by supporting legs 23 and 24, respectively, with the base 25 of column 5 upon a common supporting surface, as shown, or in any other suitable or preferred manner.

In operation, as already pointed out, the crude ammonia liquor enters the top of column 5 in a steady stream, and the volatile ammonia is boiled out in the upper part of the still by the steam rising upwards through the different compartments. The ammonia which remains in a fixed state flows out through the pipe 6 and when valves 16 and 17 are open, down through by-pass pipe 12 to the bottom of lime vessel 9. From there it passes up through the grate 19 and through the charge of lime or caustic which is supported by gravity on the grate. The lime or other caustic removes such impurities as it is capable of removing, the lime being carried upon the grate with little opportunity for clogging up the lime leg or other parts of the system. Above the lime charge the liquor flows off through the pipe 10 into the lime leg 7 from where it overflows through the pipe 8 back into the distilling column 5. The volatile ammonia is boiled out of the purified liquor which is returned to the distilling column, and such ammonia as still remains in a fixed state continues to be circulated through the lime leg and lime vessel, as already pointed out. The sludge and the like may be drawn off from the distilling column at 22, and when it is desired to recharge lime or other caustic into the vessel 9 and upon the grate 19, or to clean the grate or the interior of said vessel, the valves 16 and 17 are closed.

When said valves 16 and 17 are closed, the process goes on without interruption, the circulation continuing from the still into the bottom of the lime leg 7 and overflowing back into the still through the passage 8. When the lime vessel 9 is cleaned or recharged, the valves 16 and 17 are again opened, whereupon, the circulation goes on as before from the distilling chamber to the lime vessel and up through the lime charge on the grate 19 from the vessel 9 above said charge to the lime leg and back to the distilling column.

In Fig. 2 I have shown, instead of the by-pass pipe 12, a pipe 30 leading off from the bottom of lime leg 7' to the inlet of a suitable pump 31, the outlet of which is connected by means of a pipe line 32 leading to the bottom of lime vessel 9', the liquor flowing up through the lime charge on grate 19', as before, and being taken off from the top of lime vessel 9' through the pipe 10' to the lime leg 7' from where it overflows back to the still through the passage 8'.

As before, the bottom of lime leg 7' has a drain valve 14' and the bottom of lime vessel 9' has a drain valve 15'. The pipes 30 and 10' have valves 34 and 35, respectively, and, as before, the pipe 10' has an air vent 36. When the valves 34 and 35 are open, the liquor is pumped or flows positively through the lime vessel 9', and when said valves 34 and 35 are closed, the circulation continues without interruption through the pipe 6' to the bottom of lime leg 7' and overflows back to the distilling column through pipe 8'. The circulation through the lime vessel 9' is positive, when the pump is in operation and, as before, the lime or other caustic is supported upon the grate 19', and the danger of clogging of the system is minimized, cleaning and charging is facilitated, and the process may continue without interruption during such cleaning and charging.

In Fig. 3 the lime leg is omitted and a pipe 42 leads directly from the distilling column 40 to the bottom of the lime chamber 43. As before, the bottom of the distilling column has an outlet 44, and the liquor is led off from the distilling column through the pipe 42 and flows up through the lime charge on grate 45 into the vessel 43. The lime vessel 43 has a door 46 at its top for introducing the lime or other caustic, and a door 47 for cleaning, and the liquor upon passing up through the lime charge flows off from the top of vessel 43 through a pipe 48 and back to the distilling column 40. In this case the air vent is designated at 50, and the pipe line 42 has a by-pass pipe or passage 52 and a valve member 54 has a port 55 which is adapted to place the interior of vessel 43 in communication with pipe 48, or the pipes 52 and 48 in communication, at which time the outlet from the vessel 43 to the pipe 48 is closed. The lime vessel 43 has a drain valve 58 and the pipe line 42 has a shut-off valve 60.

When the valve 54 is in the position shown, and the valve 60 is open, the liquor flows from the distilling column through the pipe line 42, and enters the bottom of the lime vessel 43 passing up through the lime charge on the grate 45 and out through the top of the lime vessel 43 through the port 55 and pipe line 48 back to the distilling column. When it is desired to recharge the vessel 43 with lime or to clean the same, the valve 54 is rotated to place the pipes 52 and 48 in communication and close off the outlet from the vessel 43, and the valve 60 is closed. At this time the circulation continues from the still through the pipes 42 and 52 and through the port 55 and pipe 48 back to the still without passing through the vessel 43, so that the vessel 43 may be cleaned or recharged without in any way interfering with the continuity of the process.

In Fig. 4, as in Fig. 2, a pipe 75 leads off from the bottom of the lime leg 76 to the inlet of a suitable pump 77, the outlet of which pump is connected by means of a pipe line 78 to the bottom of a lime vessel 79. The ammonia in a fixed form and with its impurities, passes off from tthe upper part of the distilling column into a pipe or conduit 80 and is conducted downwardly into the bottom of the lime leg 76 by means of a depending pipe or conduit 81. The top or upper part of the lime leg or vessel 76 is connected back to the still or distilling column by a pipe or passage 82.

Leading off from the top or upper part of the lime vessel 79 is a pipe or conduit 83 and the liquor which passes through the lime vessel 79 is conducted through the pipe or conduit 83 and depending pipe or conduit 81 into the lime leg 76. A pipe or conduit 84 which may be of smaller diameter than the diameter of the pipe or conduit 83 leads off from the pipe or conduit 83 and to the inlet pipe or conduit 75 to the pump 77. A valve plate or partition 85 in the pipe or conduit 83 above or beyond the lead-off connection of the pipe or conduit 84 therefrom, has a restricted or relatively small opening 85' which permits a restricted flow only from the vessel 79 to the lime leg 76.

As before, the lime vessel 79 has a grate 86 formed to hold the lime and prevent it and the sand and the like from passing down through it, and, at the same time, permitting the liquor to pass freely up through it and the lime on said grate and above it. The vessel 79 also has at its top a door 88 for charging or introducing the lime into the vessel and a door 89 on one side for cleaning purposes. The vessel 79 also has a vent valve 90, and the vessels 79 and 76 have drain valves 92 and 93. A by-pass passage or conduit 94 leads from the pipe or conduit 80 to the pipe or conduit 75 and between the connection of the pipe 94 with it and the pump 77 the pipe or conduit 75 has a shut-off valve 95. The vessels 76 and 79 may be supported as before by supporting legs 96 and 97 or in any other suitable or preferred manner.

In operation, as before, the crude ammonia liquor enters the top of the distilling column in a steady stream and the volatile ammonia is boiled out in the upper part of the still by the steam rising upwardly through the different compartments. The ammonia which remains in a fixed state flows out through the pipe 80 and when valve 95 is open down partially at least through the by-pass 94 to the inlet pipe 75 to the pump 77, said pump 77 also drawing or pumping liquor from the bottom of the lime leg 76 by means of the connection of the pipe or conduit 75 therewith. The liquor entering the pump 77 is discharged through the outlet pipe or conduit 78 to the bottom of the lime vessel 79 and up through the grate 86 and the lime on said grate and above it. The action of the lime or other caustic in liberating the ammonia is well understood, and from the top or upper part of the lime vessel 79 the liquor flows off through the pipe or conduit 83.

The restricted opening in the plate or partition 85 permits a limited or restricted amount of the liquor to flow back through the pipe or conduit 81 to the lime leg from where it overflows back to the still through the pipe or conduit 82. All liquor flowing or passing out from the lime vessel 79 through the pipe 83 which does not pass through the restricted opening 85 back to the lime leg, flows or passes through the pipe or conduit 84 back to the inlet 75 to the pump 77 from where it is again pumped through the lime vessel 79 from below.

The liquor thus acts on the lime a number of times and only a relatively small or restricted part flowing over through the pipe 81 to the leg 76 each time a more thorough mixing of the liquor and lime takes place and the lime lasts longer and a maximum caustic effect is produced from it. The pump 77 draws or sucks from two sources and the liquor may be made to go over as fast as desired. As already pointed out, the opening 85 is restricted or relatively small and in operation the liquor which goes over to the leg 76 and back to the still, is only a percentage or small amount of that pumped, the remainder going through the lime vessel 79 and back to the pump and serving to churn up the lime in the vessel 79 and get the maximum effect therefrom. For example, if the pump is pumping forty gallons per minute and ten gallons goes over to the lime leg, the balance is recirculated through the lime vessel to expose it to the action of the lime a number of times, thereby causing a more complete reaction between the lime and liquor.

It is to be understood that a restriction in the passage 83 is not necessary for producing the recirculation through the lime vessel 79 but this same action may be produced by proper proportioning of the pipes in relation to the speed of the pump.

While I have described my invention in connection with the details of certain particular embodiments, it is to be understood that the invention is not limited to such details, and that while I have referred principally to a lime leg and lime vessel, it is to be understood that any other suitable or preferred purifying or caustic agent may be employed, so that the lime leg and lime vessel may be referred to more broadly as a purifying or caustic leg.

I claim:—

1. In ammonia distillation apparatus, the combination of a distilling column, a lime vessel, a grate for supporting a charge of lime in the bottom of said vessel, means for passing liquor from the distilling column to the bottom of the lime vessel and up through said grate and through the lime supported thereon, a lime leg, means for delivering the liquor from the lime vessel above the lime charge to the lime leg, and an overflow from said lime leg back to the distilling column.

2. In ammonia distillation apparatus, the combination of a distilling column, a lime leg, an outlet delivering ammoniacal liquor from said column to the bottom of the lime leg, an overflow from the lime leg back to the distilling column, a lime vessel, conduit means delivering liquor from said outlet ahead of the lime leg to the bottom of the lime vessel and an outlet from the lime vessel to the lime leg.

3. In ammonia distillation apparatus, the combination of a distilling column, a lime leg, an outlet delivering ammoniacal liquor from said column to the bottom of the lime leg, an overflow from the lime leg back to the distilling column, a lime vessel, conduit means delivering liquor from said outlet ahead of the lime leg to the bottom of the lime vessel, an outlet from the lime vessel to the lime leg, and valve means for closing off the flow to the lime vessel without interrupting the circulation from the distilling column to the lime leg and back to the column.

4. In ammonia distillation apparatus, the combination of a distilling column, a lime leg, a lime vessel, a grate for supporting a charge of lime therein, an outlet from the distilling column to the lime leg, a pump, outlets from the bottom of the lime leg to the pump and from the pump to the bottom of the lime vessel, an outlet from the lime vessel to the lime leg, an overflow from the lime leg to the distilling column, and valve means in the outlet from the lime leg to the lime vessel.

5. In ammonia distillation apparatus, the combination of a distilling column, a lime leg, a lime vessel, an outlet from the distilling column to the lime leg, an overflow from said leg back to the distilling column, a grate for supporting a charge of lime in the lime vessel, a pump connected to said lime vessel to discharge liquor into said vessel below said grate, said pump having an inlet leading from the bottom of the lime leg, a conduit leading from the outlet from the distilling column to said inlet, an outlet from the lime vessel to the lime leg, and means for recirculating some of the liquor through said lime vessel.

6. In ammonia distillation apparatus, the combination of a distilling column, a lime vessel having means for supporting a charge of lime therein, means for passing the ammoniacal liquor to the bottom of the lime vessel and up through the body of lime, a lime leg, means for delivering the liquor from the lime vessel above the body of lime to the lime leg and an overflow from the lime leg to the distilling column.

In witness whereof, I hereunto subscribe my name this 19th day of December, 1924.

JOHN S. UNGER.